Dec. 17, 1935.   T. A. BRYSON   2,024,424
MACHINE FOR PROCESSING MATERIAL AND METHOD
OF CONTROLLING THE OPERATION THEREOF
Filed Sept. 15, 1932   2 Sheets-Sheet 1
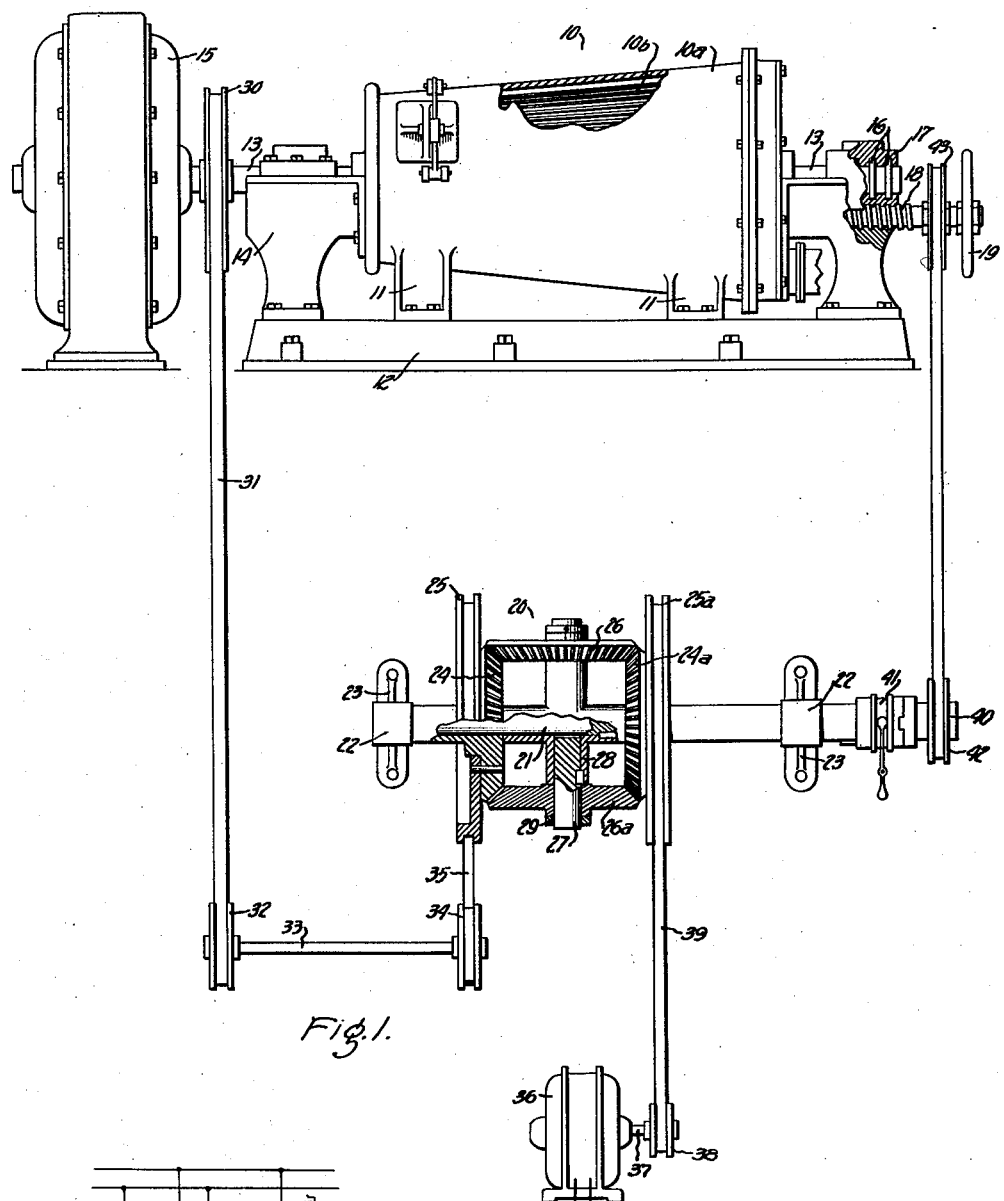
Fig.1.
Fig.1ª
INVENTOR:
TANDY A. BRYSON,
by
His Attorneys.

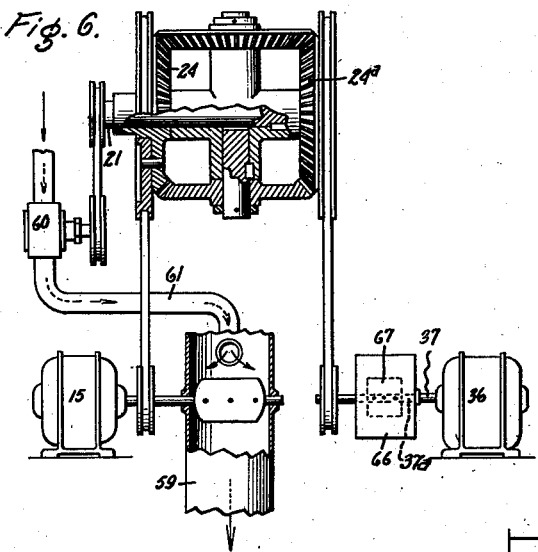
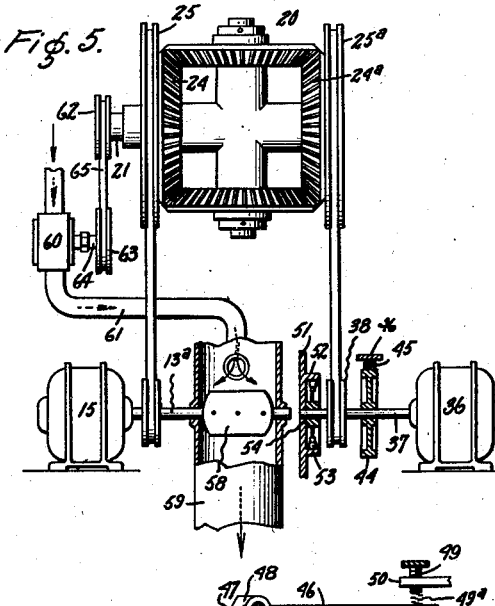
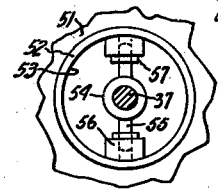
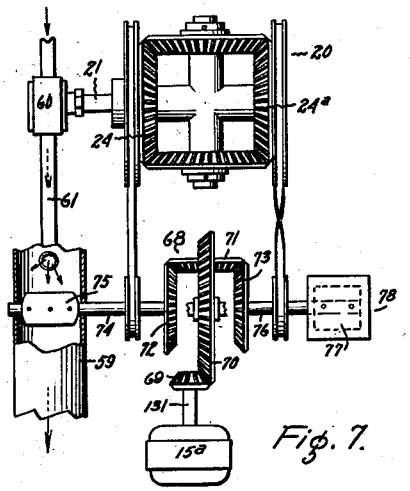
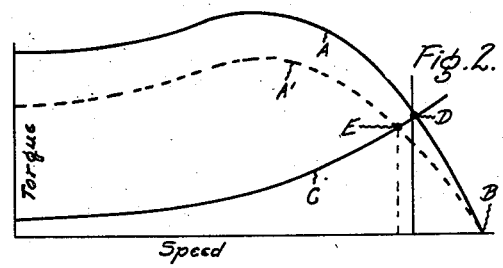
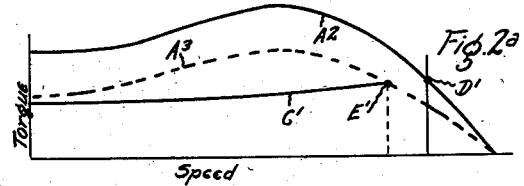
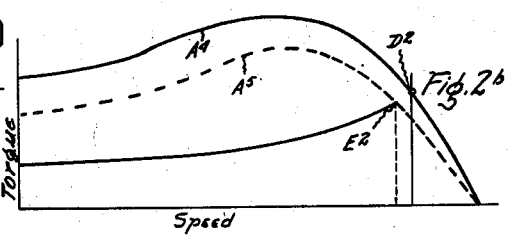
INVENTOR:
TANDY A. BRYSON
His ATTORNEYS.

Patented Dec. 17, 1935

2,024,424

UNITED STATES PATENT OFFICE 2,024,424

MACHINE FOR PROCESSING MATERIAL AND METHOD OF CONTROLLING THE OPERATION THEREOF

Tandy A. Bryson, Troy, N. Y.

Application September 15, 1932, Serial No. 633,278

29 Claims. (Cl. 92—27)

In my copending application Serial No. 570,725, filed October 23, 1931, now Patent Number 1,985,312 granted December 25, 1934, I have disclosed a means and method for controlling a characteristic of a fluent or plastic material in which the differential in speed between two moving elements caused by variations in the character of the material as effected by variations in the characteristic to be controlled is utilized to effect additions to or withdrawals from the material. In a sense, the control is effected by a direct action upon the material itself rather than upon or through the mechanism used in processing the material.

The present invention, among other things, contemplates the use of a speed differential for controlling the operation of a machine and thus indirectly controlling the characteristics of its product. It also contemplates a means and method of eliminating errors in a speed differential control of the general character described due to the effect of variations in line voltage on two different motors, and includes a control of this type employing only one motor.

One of the objects of my invention is the provision of a processing machine in which cooperating parts thereof are adjusted to deliver a product of a certain desired characteristic or to produce a desired effect. The machine is preferably controlled by a differential mechanism one movable element of which is actuated by the power motor which drives the machine and the other element of which is operated by a control motor having a substantially constant speed, the cooperating parts of the machine being adjusted in response to variations in the speeds of the respective motors.

In the control of a machine in the manner indicated above, or in the control of a characteristic of a fluent or plastic material by means of the speed differential of two different motors, there is a serious practical difficulty in protecting either motor, especially if it is of the ordinary induction type, from speed variations due to causes other than variations in the character of the product being processed by the machine. Consequently, unless both motors respond equally to such outside disturbances, the response of the regulator is erroneously affected. The most serious source of error of the foregoing character results from variations in voltage on the motors. Even though the two motors are supplied from the same circuit so that the voltage variation is the same on both, it does not necessarily follow that if their speeds are synchronized at one voltage that their speeds will be identical at another voltage. In fact, their respective speeds will be identical at all voltages only when the torque speed characteristics of the two motors and the respective torque-speed demands thereon are quite similar or substantially homologous. In accordance with my invention the control motor is adjusted, by means of a rheostat, to operate at the speed of the power motor when the latter is manipulating material having the desired characteristics or is operating a machine in a desired manner and has the effect of adjusting the torque-speed characteristic of the control motor to that of the power motor.

Furthermore, an artificial load is placed upon the control motor which imposes upon it a torque-speed demand sufficiently similar to that on the power motor operating the machine so that the two motors will respond substantially equally to voltage variations.

Other objects of my invention will appear in the specification and will be particularly pointed out in the claims.

My invention will best be understood by reference to the accompanying drawings in which I have illustrated certain embodiments thereof and in which—

Fig. 1 is a somewhat diagrammatic side view illustrating a Jordan engine and associated means for controlling the adjustment of the parts thereof;

Fig. 1a is a diagram of connections for Fig. 1;

Figs. 2, 2a and 2b are associated, comparative charts illustrating, respectively, the characteristic curve of a power motor, the characteristic curve of a control motor having an uncompensated load, and the characteristic curve of a control motor having a load imposed thereon similar to that on the power motor;

Fig. 3 is a sectional end view of a Prony brake for applying a constant load to the control motor;

Fig. 4 is a view similar to Fig. 3 illustrating a centrifugal brake for applying a variable load to the control motor;

Fig. 5 is a diagrammatic view illustrating the application of my device to a machine for controlling the character of a fluid material;

Fig. 6 is a view similar to Fig. 5 illustrating an arrangement in which a load is imposed on the control motor which is identical in character with that on the power motor when the consistency of the material is correct and under normal operation; and Fig. 7 is a diagrammatic view illustrating a further modification of my invention.

While it is to be understood that my invention is of general application, I have shown, but merely for the purpose of illustrating its construction and operation, my invention as applied to a Jordan employed in the paper making industry. In order to produce a fairly uniform product it is desirable to operate a Jordan at constant load. As explained below, the load in a Jordan operating upon stock of uniform consistency is increased by setting the plug further into the shell and decreased by withdrawing the plug from the shell. With a given plug setting the load will vary with the characteristics, such as the consistency of the material fed to the machine, and likewise the freeness of the material delivered by the machine varies with the plug setting.

Referring now to the drawings and first to Fig. 1, 10 indicates generally a Jordan engine comprising the usual shell 10a which is mounted on standards 11 which are in turn mounted on a bed plate 12. The shaft 13 for the plug 10b of the Jordan is mounted in bearings, one of which is illustrated at 14, and is driven by a power motor 15 the speed of which is assumed to vary with the load thereon. The shaft 13 is also provided with circumferential ribs 16 received in corresponding grooves in a traveling block 17 which may be moved longitudinally of the frame by a screw threaded shaft 18 which is received in a screw threaded opening in said block and actuated by a handwheel 19 in the usual manner.

In accordance with my invention the cooperating parts of the machine, in this case the shell and the plug of the Jordan, may be maintained in adjusted relation to each other so that the device will operate at constant speed and hence under constant load.

The desired adjustment is secured through a differential gearing indicated generally at 20 mounted on a shaft 21 having its bearings at 22 in standards 23. Two bevel gears 24 and 24a are rotatably mounted on the shaft and to these wheels are secured sheaves 25 and 25a respectively. A second set of gears 26 and 26a are rotatably mounted on studs 27 in a differential carrier 28 and mesh with the gears 24 and 24a respectively. The studs 27 are mounted within the carrier 28 which is in turn secured to the shaft 21. The gears 26 and 26a are held in position by collars 29 secured on the studs 27.

The sheave 25 is, in the embodiment illustrated, operated by the power motor 15 through the following elements: sheave 30 mounted on the motor shaft, belt 31, sheave 32 mounted on a shaft 33, sheave 34 and belt 35 engaging the pulley 34 and the sheave 25. The sheave 25a is actuated by a control motor 36, the shaft 37 of which is provided with a sheave 38 connected to the sheave 25a by a belt 39.

The shaft 21 of the differential may be coupled to a shaft 40 through a clutch 41. A sheave 42 is mounted on the shaft 40 and drives a sheave 43 on the shaft 18.

It is assumed that the speed of the motor 15 varies in accordance with the load on the Jordan, which varies with the consistency of the material treated by the Jordan. The control motor 36 is so adjusted that when the material acted upon by the Jordan is of the desired character, the control motor runs at the same speed as the power motor and actuates the sheave 25a and the gear 24a at the same speed as, but in the opposite direction to the sheave 25 and the gear 24 which are actuated by the power motor. Under these circumstances no planetary movement is imparted to the gears 26 and 26a, the shaft 21 is not rotated, there is no rotation of the threaded shaft 18, and no movement of the block 17. Any variation between the speed of the two gears 24 and 24a effects a rotation of shaft 21 and consequently, the sheaves or pulleys 42 and 43 are rotated to adjust the plug of the Jordan relatively to the shell thereof by moving the block 17 in one direction or the other.

In the manipulation of material with practically all devices to which my regulator may be applied, the work done varies with the speed in some manner. Usually there is a more or less constant torque required to overcome friction. Such required, mechanical-friction torque may possibly increase slightly with speed, or it may drop off slightly with increased speed. In any event there is a required torque component which is more or less independent of that required to manipulate the material.

In addition to the torque component required to overcome friction, there is a required torque component which depends upon the work done upon the material. In most cases of the manipulation of fluids or semi-fluids such, for example, as paper pulp stock treated by the Jordan engine illustrated, the torque required increases as the square of the speed of manipulation. There is, therefore, a torque demand which is a resultant or sum of the two torque components above referred to. This resultant has the characteristic of increasing with speed somewhat less rapidly than the square of the speed, since the friction component has a much slower rate of increase than does the manipulative component. Such resultant is the torque demand upon the power motor.

Referring to Fig. 2 in which the speed of the power motor is plotted against the torque, A represents the torque-speed characteristic curve of the power motor passing through the point B of synchronous speed and zero torque. The point D where the load curve C intersects the torque-speed characteristic curve will be the speed at the rated voltage. Assuming that the voltage drops 10%, then the torque-speed curve will be lowered to approximately 81% of its former value, as at A', and the point E where this latter curve intersects the load curve will be the speed of the motor at the lowered voltage.

Fig. 2a illustrates the characteristic curves of a control motor operating without a compensating load. If the speed of the control motor 36 is adjusted to conform to the normal speed of the power motor 15 by means of an adjustable resistance 36I, as illustrated in Fig. 1a, its characteristic torque-speed curve $A^2$ will, under these adjusted conditions, intersect the load curve C' at D'. The speed D' of the control motor is the same as the speed D of the power motor. In other words the adjustment of the control motor to operate at the speed of the power motor when the latter is manipulating material of the desired characteristics (or is operating the machine in a desired manner) has the effect of adjusting the torque-speed characteristic of the control motor to that of the power motor. In the event of a voltage drop of say 10%, the torque-speed characteristic curve of the control motor drops proportionately the same amount as that of the power motor to $A^3$, which, under the assumed conditions, is 81% of the torque-speed at rated voltage. Inasmuch, however, as the character of the load on the control motor differs from that on the power motor, the speed of the control motor, as determined by the intersection E' of the torque-speed curve $A^3$ and the load curve C' is different from that of the power motor. In the example illustrated, the speed of the control motor is less than that of the power motor when it should, in fact, be the same.

Fig. 2b illustrates the characteristic curves of a control motor which is provided with a compensating load in accordance with my invention. After the speed of the control motor is adjusted by means of the rheostat so that it conforms to that of the power motor at rated voltage, the load on the control motor is then adjusted or compensated, by means hereinafter described, so that its load curve, throughout the range of voltage variations which reasonably may be anticipated, is of such configuration that both motors will run at the same speed with the same voltage. This involves a simple cut and try method of compensating load adjustment with various voltages. When properly adjusted, the curves showing the speed-torque characteristics and the load on the compensated control motor will be as shown in Fig. 2b. Under these conditions a vertical line through D, representing the speed of the power motor at rated voltage will pass through the intersection of the torque-speed and the load curve of the compensated motor. Likewise, a vertical line if drawn downwardly through the point E, which indicates the speed of the power motor at the assumed lower voltage, will pass through $E^2$ which is the point of intersection of the load curve and the torque-speed curve $A^5$ of the compensated motor operating at reduced voltage. The line passing through the points $D^2$ and $E^2$ is a portion of the load curve and, being similar to the corresponding portion of the load curve of Fig. 2, it is obvious that variation in voltage on the two motors will effect equal changes in speed thereof and will not effect erroneous response of the regulator.

A simple Prony brake develops torque more or less independent of speed and its demand is quite similar to that of the mechanical friction load mentioned above. A centrifugal brake, on the other hand, develops torque in proportion to the square of the speed. By properly proportioning these two artificial torque speed demands upon the control motor, we can give to it a resultant load having the same character as the load on the power motor.

Referring to Figs. 3, 4 and 5 a drum 44 is secured to the motor shaft 37. A friction block 45 is applied to the periphery of the drum by a lever 46 pivoted at 47 on a stationary member 48. A set screw 49 which bears on a spring 49a interposed between the set screw 49 and the arm 46 passes through a stationary member 50 and engages the arm 46. By varying the adjustment of the screw, the pressure between the friction block and the periphery of the drum may be adjusted.

Referring to Figs. 4 and 5, which illustrate the centrifugal brake, a stationary member 51 surrounding the shaft 37 of the control motor is formed with a hub 52 which is provided with a cylindrical bore 53. A hub 54 is secured to the shaft 37 and rotates therewith. The hub 54 is provided with a plurality of outwardly extending arms 55 on which loosely slide the friction blocks 56. These friction blocks are driven by the rotation of the shaft 37 and the centrifugal force developed causes them to press against the inner wall surrounding the cylindrical bore 53. Obviously the faster the rotation, the greater will be the centrifugal force developed and the greater the drag exerted by the centrifugal brake. Since centrifugal force varies as the square of the R. P. M. the torque required to overcome this drag will vary likewise. In order to obtain a desired torque demand for any given speed of rotation, the weights of the friction blocks 56 may be increased to any desired extent by the addition of weights 57.

By properly adjusting the pressure of the spring 49a against the arm 46 by adjusting the screw 49 and properly adjusting the weights on the centrifugal brake, the two brakes may be so proportioned as to obtain a torque demand on the control motor which varies with the speed in a manner similar to the torque-speed demand of any machine employed to manipulate fluids or semi-fluids.

In the embodiment of my invention illustrated in Fig. 5, the power motor 15 actuates the sheave 25 secured to the gear 24 of one side of the differential in the same manner as in Fig. 1. The sheave 38 is mounted on the shaft 37 of the control motor 36 and actuates the sheave 25a secured to the gear 24a on the other side of the differential. In the embodiment illustrated, the shaft 13a of the power motor is extended and provided with a paddle 58 or other agitating device submerged in material which is flowing in pipe 59 in the direction indicated by the arrow, so that the load imposed upon the power motor 15 varies in accordance with the consistency of the material in the pipe 59 which is to be regulated. The consistency of the material in the pipe 59 is controlled by a valve 60 which admits a diluent, such as water, to the pipe 59 through the pipe 61. The valve 60 is actuated by the shaft 21 of the differential gear 20 through a sheave 62 secured to said shaft and which drives a sheave 63 on the valve shaft 64 through a belt 65.

When the material in the pipe 59 becomes too thick, the speed of the power motor 15 is decreased with the result that the gear 24 runs at a lower speed than the gear 24a and the resulting planetary movement of the gears of the differential rotate the shaft 21 to open the valve 60 to correct the consistency of the material.

In the embodiment of my invention illustrated in Fig. 6, the power motor 15 and the control motor 36 actuate the gears 24 and 24a of the differential in the same manner as heretofore described, and the shaft 21 of the differential actuates the valve 60 to control the flow of the diluent to the pipe 59 as described in connection with Fig. 5.

In the embodiment of my invention here illustrated, the shaft 37 of the control motor is extended as at 37a into a receptacle 66 in which is located a paddle or other agitator 67 mounted on the shaft 37a. The agitator 67 operates, not in a variable medium, but in a segregated sample of the material having the desired consistency. Obviously, the two motors will have identical torque-speed demands upon them when the consistency is correct and any variations in voltage will affect both motors alike and consequently produce no operation of the regulator. The regulator will, in effect, be continuously comparing the variable material with the desired standard and making corrections of that material accordingly. Here it is to be noted, that the load imposed on the control motor is of exactly the same character as the load on the power motor and functions as a compensator.

In Fig. 7, I have illustrated a still further embodiment of my invention in which a single power motor 15a actuates the differential 20 through a second differential mechanism indicated generally at 68 and which operates in the same manner as an ordinary differential of an automobile. On the shaft 131 of the power motor 15a is mounted a bevel pinion 69 which engages a bevel gear 70 and in which is mounted a bevel gear 71 meshing with bevel gears 72 and 73 so that the planetary movement of the gear 71 actuates both of the gears 72 and 73. The gear 72 actuates the gear 24 of the differential 20 while the bevel gear 73 actuates the bevel gear 24a of the differential in a manner which is obvious. In order to drive gears 24 and 24a in opposite directions, one of the belts which serves to transmit a driving force from the differential mechanism 68 to the differential 20 may be crossed whereas the other is open, the disposition of the belts depending on the necessary direction of movement of shaft 21 to open and close valve 60. The shaft 74 of the gear 72 extends within the pipe 59 and has mounted thereon a paddle 75 or other agitator adapted to rotate within the pipe 59 in which flows a fluid of variable consistency. On the shaft 76 of the gear 73 is also mounted a paddle 77 adapted to rotate within the receptacle 78 which contains a segregated sample of the material similar to that which flows in pipe 59 and of the desired consistency.

When the material in the pipe 59 is of the desired consistency then equal resistances are offered to the rotation of the gears 72 and 73, both rotating at the same speed as do also the differential gears 24 and 24a with the result that the valve 60 is not moved. When the material in the pipe 59 becomes too thick, then a greater resistance is offered to the rotation of the gear 72 than is offered to the gear 73 with the result that the shaft 21 of the differential is actuated to move the valve 60 and admit more diluent through the pipe 61 to the pipe 59.

While the control and power motors may be of quite different size and therefore may not be subjected to loads identical in amount, and further, they may have different normal speed ranges which may be compensated by the use of proper gear ratios, it is the sense of this invention, wherever adjustment of torque, speed, load, or other factors are referred to in the specification or claims, that these factors be adjusted to conditions homologous one with the other.

While I have described my invention in its preferred embodiment, it is to be understood that the words which I have used are words of description rather than of limitation and that changes within the purview of the appended claims may be made without departing from the true scope and spirit of my invention in its broader aspects.

What I claim is:

1. In combination, a device employed for controlling the processing of a material, a differential mechanism comprising a first and a second rotatable element, means for rotating said first element at a speed depending upon the character of said material, means for rotating said second element, means for imposing on said last mentioned means a load similar to that on said first mentioned means, and means responsive to variations in the relative speeds of said elements for controlling the character of said material.

2. In combination, a device employed for acting on material during the normal treatment thereof, a first rotatable element, a first motor for rotating said element at a speed varying in accordance with variations in the character of the material, a second rotatable element, a motor for rotating said second element, means for producing in said second motor a torque-speed demand similar to that of the first mentioned motor by imposing thereon an artificial load resembling that of said first motor, and means responsive to variations in the relative speeds of said elements for controlling the operation of said device.

3. In combination, a device employed for acting on material during the normal treatment thereof, a differential mechanism comprising a first and a second rotatable element, a first motor for rotating said first element at a speed varying in accordance with the character of the material acted upon, a second motor for rotating said second element, means for producing on said last mentioned motor a torque-speed demand similar to that on the first mentioned motor by imposing thereon an artificial load resembling that of said first motor, and means responsive to variations in the relative speeds of said elements for controlling the operation of said device.

4. In combination, a device employed for acting on material during the normal treatment thereof, a first rotatable element, a first motor for rotating said element at a speed varying in accordance with variations in the character of the material, a second rotatable element, a motor for rotating said second element, means for producing in said second motor a torque-speed demand similar to that of the first mentioned motor by imposing thereon an artificial load comprising a constant load component and a variable load component, and means responsive to variations in the relative speeds of said elements for controlling the operation of said device.

5. In combination, a device employed for acting on material during the normal treatment thereof, a first rotatable element, a first motor for rotating said element at a speed varying in accordance with variations in the character of the material, a second rotatable element, a motor for rotating said second element, means for producing in said second motor a torque-speed demand similar to that of the first mentioned motor by imposing thereon an artificial load comprising a prony brake and a centrifugal brake, and means responsive to variations in the relative speeds of said elements for controlling the operation of said device.

6. In a processing machine comprising two co-operating relatively movable members, a first and a second movable element, means for actuating said first element at a speed varying in accordance with the character of said material, means for actuating said second element, means for imposing on said last mentioned means a load similar to that on said first mentioned means, and means responsive to variations in the relative speeds of said elements for controlling the relative positions of said members.

7. In a processing machine comprising two relatively adjustable members, a first electric motor for actuating said machine, the speed of said motor varying with the load thereon, a first rotatable element actuated by said motor, a second rotatable element, a second electric motor for actuating said second element, means for imposing on said second motor a load similar to that on said first motor and thereby creating in said second motor a torque-speed demand similar to that of said first motor, and means responsive to variations in the relative speeds of said elements for adjusting the relative positions of said members.

8. In a processing machine comprising two relatively adjustable members, a first electric motor for actuating said machine, the speed of said motor varying with the load thereon, a first rotatable element actuated by said motor, a second rotatable element, a second electric motor for actuating said second element, means for imposing on said second motor an artificial load comprising a constant load component and a variable load component, thereby creating in said second motor a torque-speed demand similar to that on said first motor, and means responsive to variations in the relative speeds of said elements for adjusting the relative positions of said members.

9. In a Jordan engine comprising a rotatable plug which is adjustable with respect to the shell, an electric motor for actuating said plug, the speed of said motor varying with the load thereon, a first rotatable element actuated by said motor, a second rotatable element, an electric motor for actuating said second element, means for imposing on said second motor a load similar to that on said first motor and thereby creating in said second motor a torque-speed demand similar to that of said first motor, and means responsive to variations in the relative speeds of said elements for adjusting the relative positions of said plug in said shell.

10. In a Jordan engine comprising a rotatable plug which is adjustable with respect to the shell, an electric motor for actuating said plug, the speed of said motor varying with the load thereon, a first rotatable element actuated by said motor, a second rotatable element, an electric motor for actuating said second element, means for imposing on said second motor an artificial load comprising a constant load component and a variable load component, thereby creating in said second motor a torque-speed demand similar to that on said first motor, and means responsive to variations in the relative speed of said elements for adjusting the relative positions of said members.

11. In combination, a device employed for processing material, a motor, a first and a second rotatable element actuated by said motor, means for imposing on said first element a load varying in accordance with the character of said material, means for imposing on said second element a load fixed in accordance with the normal character of said material and means responsive to variations in the relative speeds of said elements for controlling the character of said material.

12. In combination, a device employed for processing a fluid material of variable character and comprising a first and a second rotatable element, a motor, a differential mechanism actuated by said motor, a first means for actuating said first element by one side of the differential, a second means for actuating said second element by the other side of the differential, an agitating device submerged in the material under treatment actuated by said first means, an agitating device submerged in the material of normal character actuated by said second means, and means responsive to variations in the relative speeds of said elements for controlling the operation of said device.

13. The method of controlling the product of a Jordan engine having a shell and a plug which comprises moving a first element at a speed varying in accordance with an actual characteristic of the product of the machine, moving a second element at a speed proportional to a desired characteristic of the product, and adjusting the plug relatively to the shell of the engine in accordance with the relative speeds of said two moving elements.

14. The method of adjusting the plug of a Jordan engine relative to the shell thereof which comprises moving a first element at a speed varying with the actual effects on the product of said engine due to variations in the relative position of said parts, moving a second element at a speed corresponding to the speed of said first element when said engine is producing the desired effect on said product, and changing the relative position of the plug and the shell in accordance with the difference in speeds of said two moving elements.

15. The method of adjusting the relative positions of the plug and shell of a Jordan engine which comprises moving an element at a speed varying with the power consumed by the engine at any actual relative position of said plug and shell, moving a second element at a speed proportional to the desired power consumption and correcting said relative positions in accordance with the relative speeds of said two moving elements.

16. In a control mechanism of the differential speed type, the combination with an electric power motor, of an electric control motor, a common source of power therefor, and means imposing upon the control motor a torque-speed demand substantially homologous to the torque-speed demand on the power motor.

17. In a control device of the differential speed type, the combination with a differential mechanism, of driving means therefor, one side of said differential being operatively associated with the subject the condition of which is to be controlled whereby its speed will vary with variations in the condition of said subject, and the other side of said differential driving a standardized load corresponding to the load on the first mentioned side when said subject is in the desired condition, and means responsive to the difference in speed of said sides for controlling the condition of the subject.

18. In a control device of the differential speed type, the combination with a first differential mechanism, of a driving means therefor, a variable first load imposed on one side of said differential, said first load varying with the condition of the subject to be controlled, a second load imposed on the other side of said differential, said second load being standardized to correspond to said first load when the subject is in the desired condition, a second differential mechanism having one side thereof driven by one side of said first differential and the other side driven in the opposite direction by the other side of said first differential, and means responsive to the difference in speed of the sides of said second differential for controlling the subject.

19. That step in the method of eliminating errors in control, due to variations in line voltage, in a differential speed control mechanism including a power motor and a control motor driven from a common power line, which comprises imposing a torque-speed demand on the control motor substantially homologous to that on the power motor throughout the range of variation in speed of said motors due to variations in voltage.

20. That step in the method of eliminating errors in control, due to variations in line voltage, in a differential speed control mechanism including a power motor and a control motor driven from a common power line which comprises imposing on said control motor a load substantially homologous to that on the power motor.

21. In a control mechanism of the differential speed type, the combination with a differential mechanism, of a power motor driving one element thereof, a control motor driving the other element thereof, means for adjusting said motors to homologous speed-torque characteristics, and means for imposing on one of said motors a load homologous to the load on the other.

22. The method of regulating the performance of a machine having cooperating parts the relative position of which affects a characteristic of the product of said machine, which comprises constantly moving an element at a speed varying in accordance with variations in said characteristic, constantly moving a second element at a speed bearing at all times substantially the same relation to the speed of the first mentioned element as the said characteristic of a standard product bears to said characteristic of the product of said machine, and adjusting the cooperation of said parts by the differential in speed of said elements.

23. In a device for processing material, a first movable element, a first electric motor for constantly moving said element at a speed varying in accordance with variations in the character of the material, a second movable element, an electric motor for constantly moving said second element at a speed bearing at all times substantially the same relation to the speed of the first element as the character of the material, when standard, bears to the actual character of the material being currently processed, a common source of electric power for said motors, means for preventing relative variations in the speeds of said motors due to variations in electric power characteristics, and means responsive to the difference in speeds of said elements for controlling the operation of the device.

24. In a device for processing material, a first movable element, a first electric motor for constantly moving said element at a speed varying in accordance with variations in the character of the material, a second movable element, an electric motor for constantly moving said second element at a speed bearing at all times substantially the same relation to the speed of the first element as the character of the material, when standard, bears to the actual character of the material currently processed, a common source of electric power for said motors, means cooperating with one of the motors for preventing relative variations in the speeds of said motors due to variations in electric power characteristics, and means responsive to the difference in speeds of said elements for controlling the operation of the device.

25. In a device for processing material, a first movable element, a first electric motor for constantly moving said element at a speed varying in accordance with variations in the character of the material, a second movable element, an electric motor for constantly moving said second element at a speed bearing at all times substantially the same relation to the speed of the first element as the character of the material, when standard, bears to the actual character of the material being currently processed, a common source of electric power for said motors, means cooperating with the second mentioned motor for preventing relative variations in the speeds of said motors due to variations in electric power characteristics, and means responsive to the difference in speeds of said elements for controlling the operation of the device.

26. A device for controlling the processing of material comprising a first element, means for constantly moving said first element at a speed varying in accordance with variations in said material as effected by variations in a characteristic thereof, a second element, means for constantly moving said second element at a speed bearing at all times substantially the same relation to the speed of the first element as the said characteristic, when it conforms to a predetermined standard, bears to said characteristic of the material being currently processed, and means actuated by the differential in speed between said elements for controlling said characteristic.

27. A control device for a material processing machine comprising a first element, means for constantly moving said element, means controlled by a characteristic of the material processed by said machine for controlling the moving speed of said element, a second movable element, means for constantly moving said second element at a speed bearing a substantially fixed relation to the speed of said first element when the material processed by said machine conforms to a predetermined standard, and means responsive to variations in the relative speeds of said elements for controlling the action of the machine on the material being processed.

28. The method of maintaining substantially constant a given characteristic of the product of a machine which comprises constantly moving a first element, varying the moving speed of said first element in accordance with variations in said characteristic, constantly moving a second element at a speed bearing a substantially fixed relation to the speed of said first element when said characteristic conforms to a predetermined standard, and regulating the action of the machine on the product by the differential in speed of said elements.

29. The method of regulating a material processing machine which comprises constantly rotating a first element, utilizing a characteristic of the material processed by said machine to control the speed of said element, constantly rotating a second element at a speed corresponding at all times to the speed of said first element when said characteristic conforms to a predetermined standard, and regulating said machine by the differential in speed of said elements.

TANDY A. BRYSON.